United States Patent
Valentine (10) Patent No.: US 11,833,727 B2
(45) Date of Patent: Dec. 5, 2023

(54) EXTRUDER INCLUDING ROTATING OUTLET AND METHOD OF USING THE SAME

(71) Applicant: CertainTeed LLC, Malvern, PA (US)

(72) Inventor: James N. Valentine, Rives Junction, MI (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 17/695,281

(22) Filed: Mar. 15, 2022

(65) Prior Publication Data

US 2022/0203594 A1 Jun. 30, 2022

Related U.S. Application Data

(62) Division of application No. 16/158,935, filed on Oct. 12, 2018, now Pat. No. 11,273,588.

(60) Provisional application No. 62/572,315, filed on Oct. 13, 2017.

(51) Int. Cl.
| | |
|---|---|
| *B29C 48/285* | (2019.01) |
| *B29C 48/03* | (2019.01) |
| *B29C 48/00* | (2019.01) |
| *B29C 48/30* | (2019.01) |
| *B29C 48/33* | (2019.01) |
| *B29K 105/16* | (2006.01) |
| *B29K 105/12* | (2006.01) |

(52) U.S. Cl.
CPC ........ *B29C 48/2886* (2019.02); *B29C 48/022* (2019.02); *B29C 48/03* (2019.02); *B29C 48/301* (2019.02); *B29C 48/33* (2019.02); *B29C 48/0022* (2019.02); *B29K 2105/12* (2013.01); *B29K 2105/16* (2013.01)

(58) Field of Classification Search
CPC ... B29C 48/765; B29C 48/766; B29C 48/767; B29C 48/301; B29C 48/33; B29C 48/297
See application file for complete search history.

(56) References Cited

U.S. PATENT DOCUMENTS

| | | | |
|---|---|---|---|
| 1,824,482 A | 9/1931 | Hartmann | |
| 2,573,050 A | 10/1951 | Camillo | |
| 3,170,190 A * | 2/1965 | Reuben | B29C 48/767 366/89 |
| 3,279,501 A | 10/1966 | Harold | |
| 3,651,187 A | 3/1972 | Cessna, Jr. | |
| 3,937,852 A | 2/1976 | Wolf | |
| 4,110,844 A * | 8/1978 | Nakamura | B29C 48/6801 366/319 |
| 4,395,210 A * | 7/1983 | Hama | B29C 48/13 425/319 |
| 4,906,171 A | 3/1990 | Miller | |
| 5,783,286 A | 6/1998 | DiNicola | |
| 5,871,801 A | 2/1999 | Kazemzadeh | |
| 6,129,873 A * | 10/2000 | Shelby | B29C 48/767 264/102 |

(Continued)

*Primary Examiner* — Jeffrey M Wollschlager
(74) *Attorney, Agent, or Firm* — MCDONNELL BOEHNEN HULBERT & BERGHOFF LLP (57) ABSTRACT

The present disclosure relates generally to an extruder for producing an extrudate. The present disclosure relates more particularly to an extruder including an extruder body having at least one material inlet and an exit opening. A rotatable outlet is coupled to the exit opening of the extruder body and is configured to rotate as the extrudate is expelled from the extruder body.

15 Claims, 3 Drawing Sheets

(56) References Cited

U.S. PATENT DOCUMENTS

| | | |
|---|---|---|
| 6,183,672 B1 | 2/2001 | Franke |
| 6,419,864 B1 * | 7/2002 | Scheuring ............... B29C 48/05 |
| | | 264/102 |
| 6,966,765 B2 | 11/2005 | Bajema |
| 7,246,936 B2 | 7/2007 | Gates |
| 7,507,464 B2 | 3/2009 | Walrath |
| 8,299,136 B2 | 10/2012 | Brown |
| 11,273,588 B1 | 3/2022 | Valentine |
| 2006/0003042 A1 * | 1/2006 | Inoue ...................... B29B 7/489 |
| | | 425/204 |
| 2012/0029145 A1 | 2/2012 | Brown |
| 2015/0218335 A1 * | 8/2015 | Kirchhoff ........... B29C 48/2517 |
| | | 366/75 |
| 2016/0113293 A1 | 4/2016 | Zaleski, Jr. |

\* cited by examiner

EXTRUDER INCLUDING ROTATING OUTLET AND METHOD OF USING THE SAME

CROSS-REFERENCE TO RELATED APPLICATIONS

This application is a divisional of U.S. patent application Ser. No. 16/233,659, filed Dec. 27, 2018, which claims the benefit of priority of U.S. Provisional Patent Application No. 62/572,315, filed Oct. 13, 2017, each of which is hereby incorporated herein by reference in its entirety.

BACKGROUND OF THE DISCLOSURE

1. Field of the Disclosure

The present disclosure relates generally to extruders, for example, for producing an extrudate with a reinforcing fibrous material. The present disclosure relates more particularly to an extruder including a rotating outlet and a method of using such an extruder.

2. Technical Background

Extruders are often used to receive one or more materials and output an extrudate through a die that imparts a specific shape to the material. The die-formed extrudate is then typically cut into pieces, optionally shaped further, and then processed into finished parts. Alternatively, or in addition, an extruder may serve as a mixing apparatus to thoroughly mix several materials together that form the finished product. If the extruder is primarily used to mix material components, a specifically shaped die may be unnecessary and a simple nozzle may be used as the extruder outlet. In certain cases, an extruder may be used to initiate a chemical reaction between the materials. In such a reactive extruder the reaction may be completed entirely within the extruder body or may continue after the extrudate has been discharged through the extruder outlet.

The present inventors have determined that for some compositions, the materials in the mixture emerging from the extruder will begin to separate upon passing through the outlet, particularly at the bottom of the extrudate. This separation of the component materials can lead to buildup on the extruder outlet, leading to defects in the finished product. In particular, if the extrudate includes a fibrous material, any buildup of the fibrous material at the outlet can lead to substantial and sometimes visible defects in the finished product. To address this problem it is possible to periodically stop production and clean or replace the extruder outlet. However, this stoppage reduces output and efficiency of the extruding process. Alternatively, some extruders include squeegees or scrapers that keep the outlet clean. However, these cleaning structures impede the flow of extrudate from the extruder thereby reducing efficiency.

What is needed is a simple and efficient way of preventing buildup on an extruder outlet.

SUMMARY OF THE DISCLOSURE

In one aspect, the present disclosure provides an extruder for producing an extrudate reinforced with a fibrous material, the extruder comprising:
an extruder body comprising one or more material inlets configured to allow the introduction of one or more materials into the extruder body and an exit opening;
a rotatable outlet coupled to the exit opening of the extruder body; and
a drive mechanism coupled to the outlet and configured to impart rotation to the outlet.

In another aspect, the present disclosure provides another method of producing an extrudate, the method comprising:
providing an extruder;
introducing at least one material component of a matrix material into an extruder body of the extruder through a first material inlet;
introducing a fibrous material, or a precursor therefor, into the extruder body through a second material inlet;
mixing the materials and conveying the mixture to the exit opening of the extruder body; and
rotating the outlet as the extrudate passes through the outlet, without any cleaning structure contacting an internal surface or distal end of the rotatable outlet.

In another aspect, the present disclosure provides a method of producing a formed article comprising
providing a production system including:
an extruder, and
a receiving surface;
introducing at least one material component of an extrudate into the extruder through a first material inlet;
mixing the materials and conveying the mixture through the outlet;
rotating the outlet so that the extrudate continues rotating as the extrudate leaves the outlet;
receiving the extrudate on the receiving surface after the extrudate has turned a predetermined rotation;
delivering the extrudate to a shaping machine; and
shaping the extrudate into the formed article.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional reactive extrusion can result in defects in the finished products formed of the extrudate. The present inventors have unexpectedly determined that the rotation of the outlet of the extruder can reduce defects in the finished products formed of the extrudate, especially when the extrudate includes a fibrous material such as glass fibers.

Accordingly, one aspect of the disclosure is an extruder with a rotatable outlet. One embodiment of such an extruder is shown in schematic view in FIG. 1. Extruder 100 includes an extruder body 110 that contains material as it passes through the extruder. The extruder body 110 includes one or more inlets configured to allow the introduction of one or more materials into the extruder body and an exit opening 116. A rotatable outlet 130 is coupled to the exit opening of the extruder body and a drive mechanism 150 is coupled to the outlet 130 and configured to impart rotation to the outlet.

Figure 1:
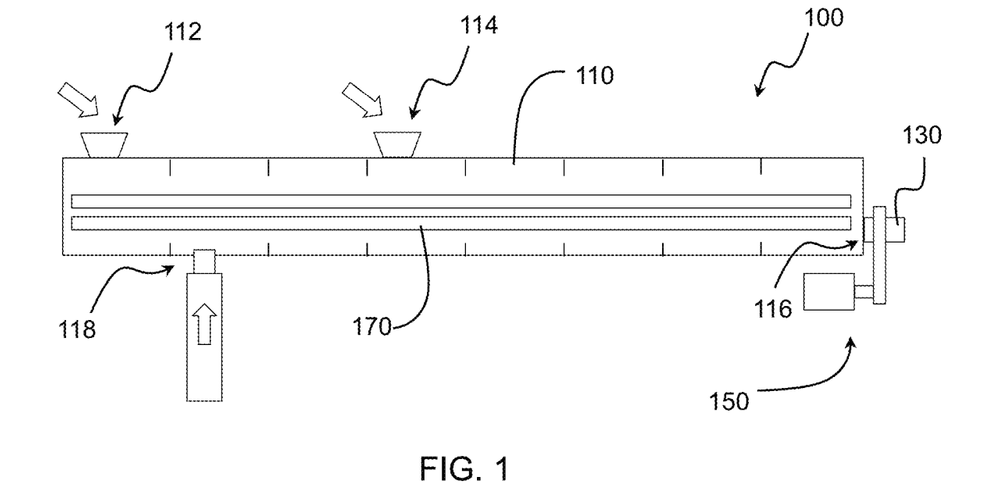
FIG. 1 is a schematic view of an extruder according to one embodiment of the disclosure.

In certain embodiments, as is conventional in the extrusion art, the extruder includes one or more rotatable screws configured to mix the materials introduced into the conveyor and to convey the mixture to the exit opening 116 of the extruder body 110. The person of ordinary skill in the art will appreciate that a wide variety of screw designs are suitable for use in the extruders and the reactive extrusion processes described herein.

In some embodiments, the extruder body 110 includes more than one inlet. This can be especially useful in reactive extrusion processes, in that it allows for separate components to be added at different times, and thus allows the person of ordinary skill in the art to adjust the course of the reaction through the extruder. For example, in the embodiment of FIG. 1, the extruder body 110 includes a first material inlet 112 configured to allow the introduction of at least one component of a matrix material into the extruder body 110. The extruder body 110 may also include a second material inlet 114 configured to allow the introduction of a fibrous material, or a precursor therefor, into the extruder body.

In addition to the first material inlet 112 and the second material inlet 114, in some embodiments the extruder body 110 may also include other inlets that receive different materials or more of the same material. For example, extruder 100 includes an additional inlet 118 coupled to a feed extruder, as discussed in more detail below. In other embodiments, the extruder body may include only a single material inlet for receiving either one material or for receiving multiple materials through the same inlet.

In certain desirable embodiments, the outlet 130 may simply be a nozzle that carries the extrudate out of and away from the extruder body 110. The use of nozzle may be appropriate, as a person of ordinary skill in the art would appreciate, where forming the extrudate into a specific cross-sectional shape is unnecessary, e.g., when the extrudate will be formed into a desired shape in a later process step. In such cases the nozzle may have a basic cross section, for example a circle, oval or regular polygon. The use of a nozzle having a substantially circular cross section can be especially desirable, in that it produces a stream of extrudate that does not wobble as the nozzle rotates.

Figure 2:
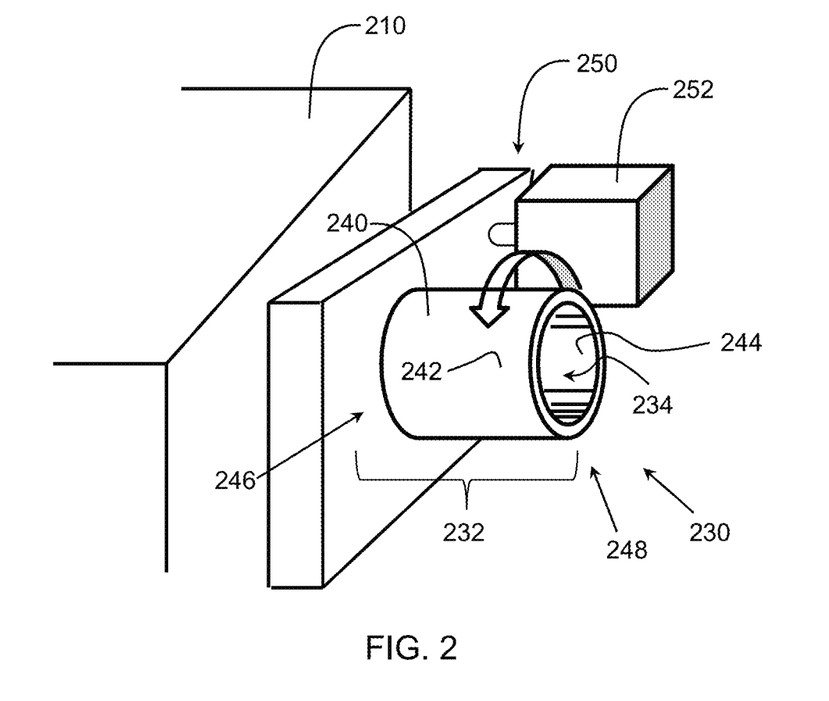
FIG. 2 is a schematic perspective view of an outlet of an extruder according to one embodiment of the disclosure.

A more detailed view of a rotatable outlet in accordance with one embodiment of the disclosure is shown in schematic view in FIG. 2. The outlet in FIG. 2 is embodied as a nozzle 230 that has a length 232 and an aperture 234 that runs through the length of the nozzle. A portion of the length of nozzle 230 in FIG. 2 is obscured by the drive mechanism 250, described in more detail below. The body of the nozzle 230 is formed by an annular wall 240 that includes an outer surface 242 surrounding the wall 240 and an inner surface 244 that defines the aperture 234 of the nozzle 230. The nozzle also includes a proximal end 246 adjacent to the extruder body 210 and a distal end 248 through which the extrudate is expelled. The person of ordinary skill will appreciate that the nozzle can be coupled to the exit opening of the extruder body in a variety of ways; rotatable couplings are familiar to the person of ordinary skill in the art.

In some embodiments, the length of the outlet is at least three inches in length, for example, in the range of 3 inches to 2 feet in length. In certain such embodiments, the outlet is at least five inches in length. In various embodiments, the outlet is in the range of 3 inches to 1 foot, or 4 inches to 8 inches, or 5 to 7 inches in length.

The size of the aperture of the outlet (e.g., in the form of a nozzle), may be defined by a characteristic width depending on the shape of the aperture. As used herein, the characteristic width for a circular aperture is the diameter, the characteristic width for an oval is the shortest width between the center of the oval, the characteristic width for a polygon having an even number of sides is the width between two parallel walls, and the characteristic width for a polygon having an odd number of sides is the width between a side and a point that is opposite the side. A person of ordinary skill in the art will appreciate appropriate characteristic widths for other shaped apertures. In some embodiments as otherwise described herein, the characteristic width of the aperture is at least ½ inch, for example, at least 1 inch. In some embodiments as otherwise described herein, the characteristic width of the aperture is no more than 8 inches, e.g., no more than 4 inches. For example, in certain particular embodiments, the characteristic width of the aperture is no is in a range of ½ inch to eight inches, or in a range of ¾ inch to 6 inches, or in a range of 1 inch to 4 inches, or in a range of 1 inch to 2 inches. In some embodiments, the outlet may have an aperture with a constant cross section along its length. In other embodiments the outlet may be tapered or have a tapered section; in such embodiments, the aperture can have the above-described widths at the end distal to the extruder body.

In some embodiments of the disclosure, the outlet may be formed of a polymer material, for example polyvinyl chloride. In other embodiments, the outlet may be formed of a metal, for example aluminum or steel. It will be apparent to those of ordinary skill in the art that the outlet may be formed of other materials based on various factors, such as the composition of the extrudate. Notably, the outlet may be provided as a length of cylindrical tubing, e.g., a length of PVC tubing or a length of steel tubing. The person of ordinary skill in the art can make a nozzle out of tubing by simply cutting the tubing to the desired length, and coupling it to the exit opening of the extruder body. Notably, when tubing is used to form a nozzle, it is inexpensive, and can simply be discarded (e.g., instead of cleaned) when it becomes fouled by extrudate. Thus, the use of a tubular nozzle can be especially advantaged over prior art systems.

In some embodiments, the aperture 234 of the nozzle 230 is completely open along the entire length of the nozzle. The term open, as used herein, means that no mechanical or structural components of the extruder are disposed inside the aperture of the outlet. For example, no interior mandrels or screws are located within the nozzle. Of course, during operation the outlet will be filled with extrudate, but the outlet structure itself may still be considered open, so long as no other structure is disposed within the outlet. In specific embodiments, the extruder does not have any cleaning apparatus that operates on the nozzle during the extruding process. For example, there is no scraping element, squeegee or any other cleaning structure that is in contact with the inner surface 244 of the nozzle. Likewise, in some embodiments, there is no such cleaning structure that is in contact with the distal end 248 of the outlet 230. While such cleaning components may be used on the nozzle during maintenance, in some embodiments, there is no such structure that contacts the nozzle during a normal extrusion process.

The present inventors have noted that rotating the outlet (e.g., in the form of a nozzle) during extrusion can provide a number of benefits. For example, rotation can help to prevent buildup of material on the nozzle wall 244 and/or reduce or avoid the associated defects in the finished product. Some embodiments of the disclosure have a drive mechanism 250 that includes a motor 252 configured to impart the rotation to the outlet 230. A person of ordinary skill in the art will appreciate that the motor may take a number of different forms to appropriately impart rotation to the nozzle. For example, the motor may be an electric motor. In some embodiments, the drive mechanism also includes a drive train 254 to transfer the power of the motor 252 to the outlet 230. For example, the drive train may include a belt, a chain or a gear box. The person of ordinary skill in the art will appreciate that a wide variety of motor/drive train arrangements can be configured to rotate the outlet 230.

In other embodiments, the drive mechanism 250 may be coupled to and receive power from the screw mechanism. In many embodiments, the screw mechanism will rotate significantly faster than the outlet, and therefore a gearing system may be used to reduce the rotational speed that is imparted to the outlet 230. However, in other embodiments, such as when using a motor, the drive mechanism 250 may operate independently of the screw mechanism. When an independent drive mechanism is used, for example including the motor 252, the speed of rotation may be set by the motor.

Irrespective of the type of drive mechanism, the person of ordinary skill in the art will, based on the disclosure here, select a rotation speed that provides the desired extrudate/product properties. For example, in certain embodiments, the outlet is rotatable or rotated at at least 5 rpm, e.g., at least 10 rpm. In certain embodiments, the outlet is rotatable or rotated at no more than 100 rpm, e.g., no more than 50 rpm. in some embodiments the outlet is rotated in a range of 5 to 100 rpm, or in a range of 10 to 50 rpm, or in a range of 20 to 40 rpm, for example, 25-35 rpm.

In certain embodiments, the rotating outlet 230 of the extruder may provide one or more advantages. In some embodiments, the rotation of the outlet prevents gravity from causing any buildup of material at one specific location on the circumference of the outlet, for example the bottom of the outlet. In other embodiments, where the extruder has provided a substantial amount of mixing of the materials in the extrudate, the rotation of the outlet may continue the mixing process. This continued mixing may prevent or hinder any separation of the components of the extrudate as they pass through the outlet, where such separation might otherwise cause defects in the completed part.

Although rotation of the outlet 230 may reduce the formation of defects in the finished products, in some processes complete elimination of defects is not possible. In such instances, the rotation of the outlet 230 may assist in moving the defects from certain surfaces where the defects are more problematic to other surfaces where such defects are less problematic. For example, in some embodiments, the speed of the rotating outlet 230 may be controlled so that the extrudate continues rotating as the extrudate leaves the outlet. In these embodiments, a receiving surface for the extrudate may be positioned so that the extrudate is received on the receiving surface only after the extrudate has turned a predetermined amount of rotation. In some embodiments, the outlet may be rotated such that the extrudate is turned about 90° before it is received by the receiving surface. For example, the outlet may be rotated so that the extrudate is turned in a range of 75° to 105°, or in a range of 80° to 100°. Alternatively, in other embodiments, it may be possible to rotate the outlet at a speed which imparts a turn of about 180° before the extrudate is received on the receiving surface. For example, the outlet may be rotated so that the extrudate is turned in a range of 160° to 200°, or in a range of 170° to 190°. As used herein, the term "received" on the receiving surface corresponds to when the extrudate has come to rest and stopped turning. Thus, the extrudate may have some continued rotation after first contacting the receiving surface before it has come to rest and been "received" on the receiving surface.

Figure 3:
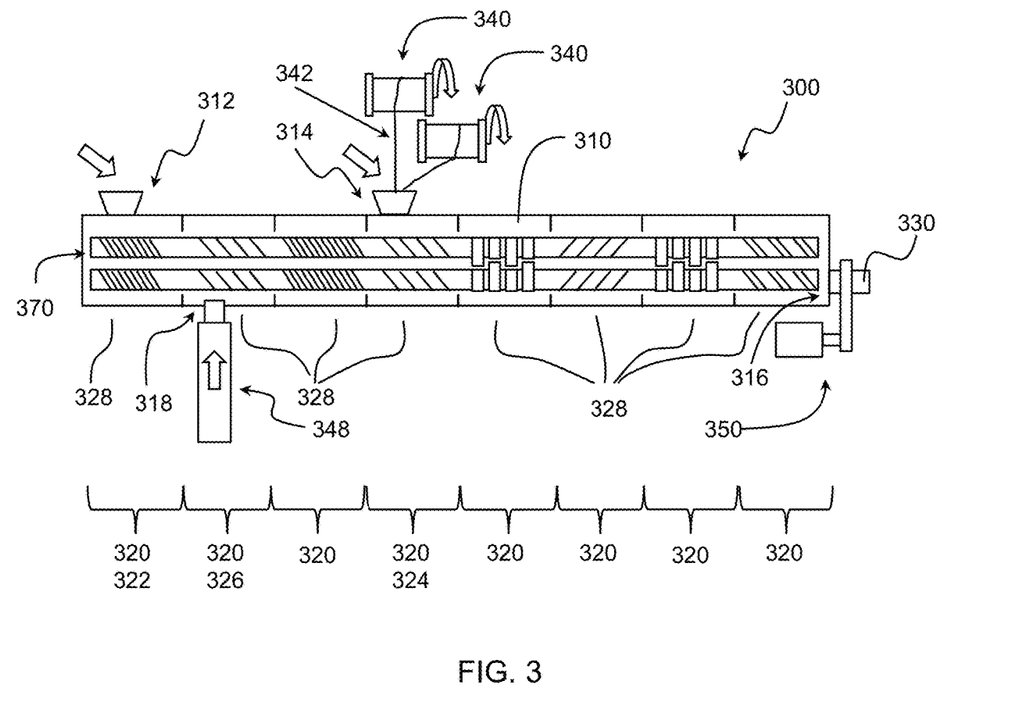
FIG. 3 is a schematic view of an extruder according to another embodiment of the disclosure.

Another embodiment of an extruder in accordance with the present disclosure is shown in FIG. 3. The schematic illustration in FIG. 3 shows more detail than that of FIG. 1. Extruder 300 in FIG. 3 includes an extruder body 310 including several inlets 312, 314, 318 for receiving material into the extruder body 310. The extruder body also includes an exit opening 316 at the downstream end of the extruder where the extrudate leaves the extruder body 310. A screw mechanism 370, in the form of a twin extruder screw, is disposed in the extruder body 310. In other embodiments, the screw mechanism may be a single extruder screw, as will be appreciated by those of ordinary skill in the art. The screw mechanism 370 is used to convey the material through the extruder and may also be used to mix the component materials of the extrudate. A rotatable outlet 330 is coupled to the exit opening 316 of the extruder body 310 and is driven by a drive mechanism 350.

In some embodiments, as depicted in FIG. 3, the extruder body is formed by a group of modules. Extruder 300 is shown as having 8 modules. In other embodiments the extruder may be formed in a range of 3 to 12 modules, or in a range of 5 to 10 modules. Each of the modules 320 includes a barrel segment 328 that surrounds the screw 370. The barrel segments 328 contain the materials passing through the extruder and may include openings or other features that impact the extrusion process and the materials in the extruder. For example, the various barrel segments 328 can include one or more inlets into the extruder, or vents that allow any gases formed within the extruder to be released. Further, the barrel segments may also include heating or cooling configurations. Using the modular barrel segments, various components of the extruder can be located as required for the specific extrusion process, with vents, inlets, heating and cooling arranged as appropriate for the particular process.

In some embodiments, the first material inlet 312 may be positioned in the barrel segment 328 of one of the modules 320, while the fibrous material inlet 314 may be positioned in another barrel segment 328 of a different module 320. For example, in FIG. 3, the first material inlet 312 is disposed in the first module 322 while the fibrous material inlet 314 is disposed in the second module 324. As is evident from FIG. 3, the characterization of the modules as a first module and a second module is not connected to their position with respect to the upstream end and downstream end of the extruder 300. Indeed, as shown in FIG. 3, the second module 324 is located in the fourth position from the upstream end of the extruder.

In some embodiments, the extruder may include at least one spool 340 to provide a fibrous material precursor 342 to the fibrous material inlet 314. The fibrous material precursor can be provided as a roving, which is broken up by the action of the extruder to provide a fibrous material in the extrudate. For example, the fibrous material precursor 342 may be disposed on the spool as a roving that unwinds as it is fed into the extruder 300. In some embodiments, the spool may be held on bearings so that the spool may rotate as the fibrous material unwinds. In certain embodiments the fibrous material precursor may be fed into the extruder using a feeding mechanism, or the operation of the extruder itself, particularly the screw mechanism, may pull the fibrous material into extruder. Extruder 300 includes two spools 340, however it is also possible to use more than two spools, for example three or more spools, or it is possible to use a single spool. Other methods of feeding fibrous material or precursors thereof through the fibrous material inlet 314 are also possible, as a person of ordinary skill in the art will appreciate. For example, the fibrous material can be provided as short fibers that are added much in the same way a particulate filler would be.

While particular reactive extrusion apparatuses are described herein, the person of ordinary skill will appreciate that conventional reactive extruder apparatuses can be used in the systems and methods described herein.

As will be appreciated by those of skill in the art, the matrix material can be composed a variety of different materials. In some embodiments, as described in more detail below, the matrix material may be made of polyurethane. As the person of ordinary skill in the art will appreciate, the reaction between an appropriate polyol and an appropriate diisocyante may be begun in the reactive extruder body, by adding the relevant feedstocks through appropriate inlets. But other materials suitable for preparation by reactive extrusion, such as polyesters, can alternatively be processed using the systems and methods described herein. In some embodiments, the matrix material or a precursor thereof may be added to the extruder in a single form at a single stage, for example in the first material inlet. Alternatively, in other embodiments, the matrix material may be added in various stages of the extrusion process in a single form or as separate precursor materials that make up the final matrix material. Of course, it is also possible to add the separate precursor materials of the matrix material at separate stages in the extrusion process, for example through different inlets in different modules of the extruder. For example, as described in more detail below, the precursors of a polyurethane matrix material may be added at different stages of the extrusion process through different inlets.

In some embodiments, the precursor materials of the matrix material may undergo a chemical reaction within the extruder to form the matrix material. In such an extruder, the pressure may be significantly lower than in extruders that rely on pressure to force thermoplastic material through a die. For example, in some embodiments utilizing reactive extrusion, the pressure in the extruder body 310 may not exceed 200 psi. In some embodiments of a reactive extruder the pressure may not exceed 100 psi.

In some embodiments, extruder 300 also comprises a filler inlet 318 through which a filler material may be added to the extruder body 310. Of course it is also possible to add filler through one of the other inlets, such as first inlet 312 or second inlet 314, along with another material, such as the matrix material, the fibrous material or a precursor of the fibrous material. In some embodiments, the extruder 300 includes a feed extruder 348, or side stuffer, to provide the filler material to the filler inlet 318. Such a feed extruder 348 may be similar to a larger extruder and include an extruder screw to convey material to the filler inlet of extruder 300. In extruder 300 the filler inlet 318 and corresponding feed extruder 348 are included in a third module 326 of the extruder body 310. In some embodiments the third module 326 including the filler inlet 318 may be disposed between the first and second modules, i.e., between the first material inlet 312 and second material inlet 314.

In addition to having different barrel segments 328, in some embodiments, the different modules 320 may also have different screw elements that carry out different stages of the extrusion process. For example, different modules may include screw elements that are utilized for different purposes within the extruder. In particular, certain modules may include screw elements that are primarily adapted to convey the materials and other modules may include screw elements that are adapted to mix the materials, such as paddles, kneading blocks or reverse elements. In some embodiments modules can include both mixing and conveying screw elements. In some embodiments mixing elements are included in the downstream end of the extruder. For example, in some embodiments at least two mixing modules are included downstream of the fibrous material inlet, where the mixing modules comprise screw elements that include mixing elements.

In some embodiments, power and motion may be imparted to the screw elements of the separate modules using spline shafts. For example, in some embodiments groups of screw elements are looped onto a spline shaft that rotates during the extrusion process. In some embodiments, when a twin screw is used, the extruder may include two spline shafts.

Another aspect of the disclosure is a method of producing an extrudate including providing an extruder (e.g., as otherwise described herein) and introducing at least one material component of a matrix material into the extruder body 310 through a first material inlet 312. A fibrous material, or a precursor therefor, is also introduced into the extruder body through the a second material inlet 314. The materials are mixed and the mixture is conveyed to the exit opening 316 of the extruder body 310. The outlet 330 is rotated as the extrudate passes through the outlet, without any cleaning structure contacting an internal surface or distal end of the rotatable outlet 330.

In some embodiments, the first material inlet 312 is positioned in a module 320 at the upstream end of the extruder 300. For example, the matrix material or a component of the matrix material may be added through the first material inlet 312. If the material added through the first material inlet is only a component of the matrix material, other components may be added at downstream modules or in the same module. In some embodiments the filler material is added downstream of the first material inlet, for example in a downstream module. In the embodiment depicted in FIG. 3, the filler material is added in the third module 326 downstream of the first module 322, which includes the first material inlet. In some embodiments, the fibrous material or a precursor therefor is added at a further downstream location, such as the second module 324. In some embodiments the fibrous material or precursor therefor may be added to the extruder along with other material components of the matrix material. For example, the fibrous material or precursor therefor and other matrix material components may be added in the same module.

In some embodiments, the extrudate includes a polyurethane, for example a matrix material made of polyurethane. In some embodiments, the extrusion process includes the chemical reaction that produces the polyurethane. In such a reactive extruder, the precursor materials of the polyurethane may be added individually into the extruder body 310. For example, in some embodiments, one precursor of the polyurethane (e.g., a polyol) may be added through the first material inlet and another material component of the polyurethane (e.g., an isocyanate) may be added through another inlet. In some embodiments, one of the precursors of the polyurethane may be added to the extruder body in the second module 324 along with the fibrous material or precursor 342.

In some embodiments, the method includes adding at least one polyol to the extruder body. The polyol may be a plant or oil based polyol. In some embodiments the polyol may include a polyester polyol, polycarbonate polyol, polyacrylic polyol, polyether polyol and other polyols as would be understood by those of ordinary skill in the art. In extruder 300, the polyol may be added to the extruder body 310 through the first material inlet 312.

In some embodiments, the method includes adding at least one monomeric or oligomeric poly- or di-isocyanate into the extruder body. For example, the isocyanate may be added along with the polyol or it may be added through a separate inlet in the extruder body. In some embodiments, the isocyanate is introduced to the extruder body downstream of the polyol. For example, the isocyanate may be added to the extruder body in the second module 324 along with the fibrous material or precursor 342. In some embodiments, the isocyanate is added to the extruder body through the fibrous material inlet 314. In other embodiments, the isocyanate is added to the extruder body at the second module 324, but through a separate inlet.

In some embodiments, the fibrous material is a fiberglass material. During the extrusion process, the mixing of the fibrous material with other materials may be configured to maintain a considerable length to the fibers, or the fibers may be finely chopped up during the mixing stages of the extruder. For example, the extrusion process may chop the fibers to less than about a quarter of an inch, such as less than 300 thousandths of an inch. In some embodiments, the fibers are chopped to an average length in a range of 50 to 250 thousandths of an inch, or in a range of 100 to 200 thousandths of an inch. Other embodiments of the disclosure may include the use of other fibrous materials (or no fibrous materials). For example, some embodiments may use polymeric fibers (e.g., polyester fibers, polyamide fibers, aramid fibers), carbon fibers, basalt fibers, inorganic fibers, glass fibers, graphite fibers, ceramic fibers, vermiculite fibers, wollostonite fibers, and mixtures thereof, or other fibrous materials, e.g., in chopped and/or milled form.

It is also possible to use wood fibers, paper fibers, or other organic fibers, e.g., hemp fibers, cotton fibers, plant fibers, in some embodiments.

When extruding with a fibrous material, as in the extruder shown in FIG. 3, the fibrous material only makes up a certain percentage of the extrudate. In many embodiments, the weight percentage makeup of the fibrous material is no more than 50% of the extrudate. In some embodiments the weight percentage makeup of the fibrous material in the extrudate is in a range of 0% to 20%, 0% to 15%, 1% to 15%, or 5% to 10%, for example 6% to 8%. In some embodiments, the remaining composition of the extrudate is made up of a matrix material and, possibly, a filler as described in more detail below.

In some embodiments, the method also includes introducing a filler material into the extruder body through a filler inlet. In some embodiments, the filler may be an organic or inorganic filler material. For example, in some embodiments, the filler may include a coal ash, such as fly ash or bottom ash. In other embodiments the filler may include calcium carbonate or granite. Other fillers may also be utilized as would be understood by a person of ordinary skill in the art, e.g., fine sand, ceramic particle, glass particles, and mixtures thereof. A broad particle size distribution of particulate mineral fillers can provide for particulate packing which facilitates incorporating high levels of particles in the reaction mixture and the composite material. Particle size distributions of the particulate mineral fillers, in one embodiment, range from about 5 µm to about 200 µm, and in another embodiment, from about 20 µm to about 50 µm.

In some embodiments the weight percentage makeup of the filler is in a range of 30% to 80%, or in a range of 50% to 70%, for example in a range of 55% to 65%.

The polyurethane materials described in U.S. Pat. No. 9,650,466, hereby incorporated herein by reference in its entirety, can be suitably adapted for use in the apparatuses, processes and systems described herein. For example, in certain embodiments, the matrix material is a polyurethane, having as two material components one or more polyols and one or more isocyanates, i.e., to form a reaction mixture to form the polyurethane. The reaction mixture can include, along with polyol(s) and isocyanate(s), one or more of amine catalysts, organometallic catalysts, and a blowing agent. The reaction mixture can also include one or more of surfactants, wetting agents, plasticizers, light and heat stabilizers and antioxidants, flame retardants, mold release agents, and antistatic agents.

Polyether polyols that can be suitable to form the polyurethane include low-viscosity polyether polyols having a first molecular weight and a functionality of about 3 or less, and in one embodiment, a functionality from about 2 to about 3. Also, polyether polyols having a second molecular weight lower than the first molecular weight and a functionality of about 3 or greater can be used in the reaction mixture when greater than 50 weight percent of the polyols in the mixture has a functionality of 3 or less. Particularly, in one embodiment, the ratio of the weight of polyether polyols having a functionality of about 3 or less to the weight of polyether polyols having a functionality of about 3 or greater is about 1:1 to about 5:1, and in another embodiment from about 1.5:1 to about 3.0:1. Polyether polyols with a functionality of about 3 or less provide flexibility to the composite material while polyether polyols with a functionality of greater than about 3 provide rigidity to the polyurethane. The person of ordinary skill in the art can use one or both types of polyols, and can balance the amounts of the two to arrive at a desired rigidity of the polyurethane.

Suitable polyether polyols include, but are not limited to, polypropylene glycol, polyethylene glycol, polytetramethylene ether glycol, glycerol, neopentyl glycol, 1,2-pentane diol, pentaerythritol adducts, 1,6-hexane diol, 1,3-butylene glycol, trimethylolpropane adducts, trimethylolethane adducts, ethylendiamine adducts, and diethylenetriamine adducts. Polyether polyols are commercially available from, for example, Bayer Corporation under the trademark MULTRANOL.

Useful polyisocyanates include aromatic polyisocyanates. Suitable examples of aromatic polyisocyanates include 4,4-diphenylmethane diisocyanate (methylene diphenyl diisocyanate), 2,4- or 2,6-toluene diisocyanate, including mixtures thereof, p-phenylene diisocyanate, tetramethylene and hexamethylene diisocyanates, 4,4-dicyclohexylmethane diisocyanate, isophorone diisocyanate, mixtures of 4,4-phenylmethane diisocyanate and polymethylene polyphenylisocyanate. Higher polyisocyanates such as triisocyanates can be used, for example, 4,4,4-triphenylmethane triisocyanate 1,2, 4-benzene triisocyanate; polymethylene polyphenyl polyisocyanate; and methylene polyphenyl polyisocyanate. Isocyanates are commercially available from Bayer USA, Inc. under the trademarks MONDUR and DESMODUR. In certain embodiments, the ratio of isocyanate to polyol (isocyanate index), based on equivalent weights of OH groups (hydroxyl index) and NCO groups, ranges from about 0.5:1 to about 1.5:1, and in one particular embodiment, from about 0.8:1 to about 1.2:1.

In certain desirable embodiments, two different catalysts are used in the reaction mixture. A first catalyst (gel catalyst) can be selected to promote the gelling reaction between hydroxyl and isocyanate groups and accelerate curing of the system; an amine catalyst can be suitable for this purpose. Suitable amines can include primary, secondary, and tertiary amines. Some examples of amines include, but are not limited to, diisopropanolamine, triethanolamine, triethylamine, monoethanolamine, dimethylethylamine, dimethylethanolamine, and 2-amino-2-methylpropanol triethylene diamine. The amount of amine catalyst can range, for example, from about 0.01 weight percent to about 0.1 weight percent of the overall reaction mixture. A second catalyst (foaming catalyst) can be selected to promote the reaction between water and isocyanate groups and accelerate generation of $CO_2$ used as a blowing agent to foam the system; examples of such catalysts include, for example, organometallic catalysts, including carboxylates and mercaptides. Some non-limiting examples of organometallic catalysts include organotin compounds, including dibutyltin dilaurate and dibutyltin oxide. The amount of organometallic catalyst can range, for example, from about 0.001 weight percent to about 0.01 weight percent. In other embodiments, more (or fewer) than two catalysts can be used. Further, both the gel and foaming catalysts can be delayed action catalysts to extend curing and/or foaming time, for example, UL-29 and A-530 catalysts, commercially available from General Electric Company.

Surfactants and wetting agents can be included to the reaction mixture to facilitate the mixing of any solid components (e.g., fibrous materials) into the liquid components of the reaction mixture. Anionic and cationic surfactants can be used, for example, silicone surfactants, such as DC-197 or DC-193 commercially available from Air Products, Inc, or Niax Silicone L-1602 commercially available from General Electric Company. The amount of surfactant used is typically, for example, about 0.5 weight percent or less.

A blowing agent can used to facilitate the foaming of the polyurethane and to control the density of the composite material, in cases where such is desired. Organic blowing agents, for example, halogenated hydrocarbons, hexanes, and fluorocarbons can be used. Also, water can be used as a blowing agent resulting from the formation of carbon dioxide from the reaction of water and isocyanate. When water is used as the blowing agent, from about 0.1 weight percent to about 3.0 weight percent of water can be added to the reaction mixture. Varying the amount of blowing agent used facilitates controlling the density of the material. In one embodiment, the density of the composite material is about 20 pounds per cubic foot ($lbs/ft^3$) to about 90 $lbs/ft^3$, and in another embodiment from about 30 $lbs/ft^3$ to about 75 $lbs/ft^3$.

Solid components of the reaction mixture include particulate and/or filament mineral and/or organic fillers, and pigments. The solid components can also include light and heat stabilizers and antioxidants, antistatic agents, mold release agents, and flame retardants.

A variety of other materials can be used in the reaction mixture. Fibrous materials such as chopped and/or milled fibers and particulate mineral fillers can be used as described above. Moreover, as explained above, the solid components of the reaction mixture include particulate mineral fillers, chopped and/or milled reinforcing fibers, and pigments.

To provide a uniform color to the material, pigments can be added to the reaction mixture, e.g., in amounts ranging from about 1.0 weight percent to about 15 weight percent. Any suitable mineral or organic pigment or mixtures of pigments can be incorporated into the composite material, for example, iron oxide, titanium dioxide, and carbon black. Other additives can be added to the reaction mixture to provide desired properties to the composite materials, for example, heat stabilizers, light stabilizers, and antioxidants.

To provide for uniform mixing of the solid components with minor quantities of liquid components, and thereby control mechanical properties and density, plasticizers/lubricants can be added up to about 5 weight percent. Suitable plasticizers include viscose natural or synthetic aromatic hydrocarbons, or mixtures of aromatic and non-aromatic hydrocarbons, for example, VYCEL, commercially available from Crowley Chemical Co.

Additional polyurethane systems that can be adapted for use in the apparatuses, methods and systems described herein include, for example, those described in U.S. Pat. Nos. 7,763,341, 8,299,136, 8,846,776, 9,139,708, 9,481,759 and 9,512,288 each of which is hereby incorporated by reference in its entirety for all purposes, and specifically for the purpose of describing suitable materials for use in the apparatuses, methods and systems as otherwise described herein.

While the methods, apparatuses and systems described herein can be especially useful in processing polyurethane-based materials, a variety of materials can be used in the processes and systems described herein. For example, a variety of thermoplastic and thermoset polymeric materials, highly-filled polymeric materials, elastomers, ceramic materials, and cementitious materials can be used in the processes and systems described herein.

Figure 4:
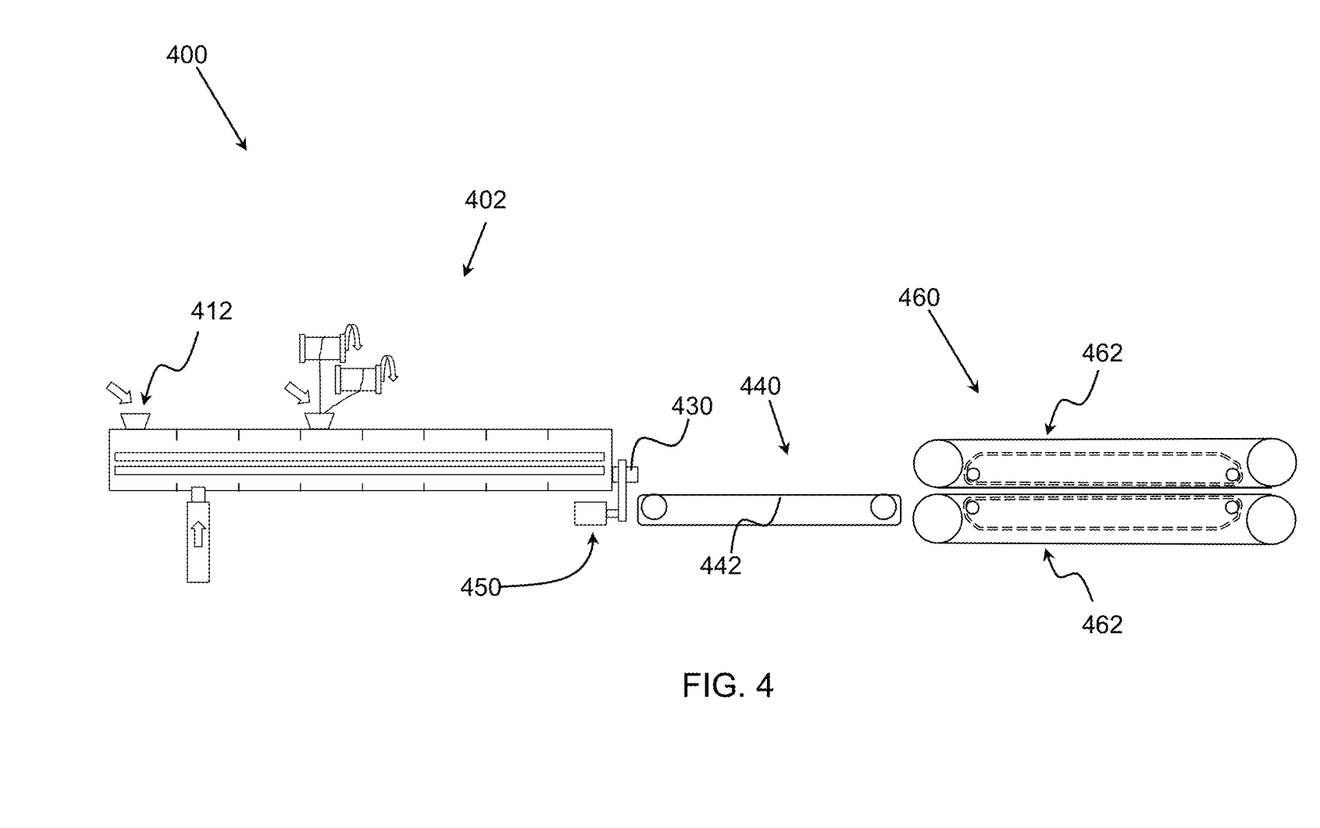
FIG. 4 is a schematic view of a system for processing an extrudate according to one embodiment of the disclosure.

Another aspect of the disclosure is a production system for processing an extrudate into a formed article. An embodiment of such a system is shown in FIG. 4. Production system 400 includes an extruder 402 that may include any of the features described above with respect to extruder 300. In particular, the extruder 402 includes a material inlet 412, a screw 470, a rotatable outlet 430 and a drive mechanism 450 for rotating the outlet 430. Downstream of the outlet 430 of the extruder 402 is a receiving surface 440 that receives the extrudate as it exits the extruder outlet 430. In some embodiments the receiving surface is a conveyor belt including a poly release film 442. The conveyor belt conveys the extrudate to a shaping machine 460. For example, in some embodiments the shaping machine is a double belt forming machine.

The double belt forming machine 460 receives the extrudate and presses or molds the extrudate into a formed article between two rolling belts 462. In some embodiments the shaping machine 460 impresses a pattern on one side of the formed article that is intended to be seen and another pattern on the opposite side of the formed article that is not intended to be seen. For example, the shaping machine 460 may impress a complex wood pattern onto one side of an article of siding and make the opposing side flat and unornamented.

In some embodiments, the formed article may include a variety of items as would be understood by a person of ordinary skill in the art. For example, the articles formed from the extrudate may include, siding materials, roofing materials, synthetic lumber, building panels, decking materials, railings, and fencing.

Another aspect of the disclosure is a method of producing a formed article. The method includes providing a production system 400 including an extruder 402 (e.g., as described herein) and a receiving surface 440. At least one material component of an extrudate is introduced into the extruder through a material inlet 412. The materials are mixed (and, optionally, reacted) and the mixture is conveyed through an rotating outlet 340. The extrudate is delivered to a shaping machine 460, where the extrudate is shaped into the formed article. The outlet can be rotated, e.g., at a speed as described above.

In certain embodiments, the outlet 430 is rotated so that the extrudate continues rotating as the extrudate leaves the outlet 430, and the extrudate is received on the receiving surface 440 only after the extrudate has turned a predetermined amount of rotation. By rotating the outlet 430, rotation is imparted to the extrudate which can assist in moving the defects from certain surfaces where the defects may be more problematic to other surfaces where such defects may be less problematic. For example, in some embodiments, the speed of the rotating outlet 430 may be controlled so that the extrudate continues rotating at a certain rate as the extrudate leaves the outlet. In such embodiments, the receiving surface for the extrudate may be positioned so that the extrudate is received on the receiving surface only after the extrudate has turned a predetermined amount of rotation to where any defects are located on the surface of the extrudate that corresponds to a less problematic area of the formed article. In some embodiments, the outlet may be rotated such that the extrudate is turned about 180° before it is received by the receiving surface. For example, the outlet may be rotated so that the extrudate is turned in a range of 140° to 220°, or in a range of 160° to 200°, or in a range of 170° to 190°. Alternatively, in other embodiments, it may be sufficient to rotate any potential defects to a side of the extrudate, such that the outlet at a speed imparts a turn of about 90° before the extrudate is received on the receiving surface. For example, the outlet may be rotated so that the extrudate is turned in a range of 80° to 100°, or in a range of 70° to 110°. The person of ordinary skill in the art will, based on the disclosure herein, and depending on the particular forming process to be used, determine a desired rate and degree of rotation to provide a desirably low degree of defects in a formed product.

In some embodiments, the shaping machine imparts a more complex pattern on a bottom side of the article than on a top side of the extrudate. With such a configuration, a rotation of about 180° moves any potential defects on the bottom of the article to the less ornamented top side of the article.

It will be apparent to those skilled in the art that various modifications and variations can be made to the processes and apparatuses described here without departing from the scope of the disclosure. Thus, it is intended that the present disclosure cover such modifications and variations of this invention provided they come within the scope of the appended claims and their equivalents.

What is claimed is:

1. A system for producing a formed article, the system comprising:
    an extruder comprising:
        an extruder body comprising one or more material inlets each configured for the introduction of a material component of an extrudate comprising a polyurethane into the extruder body, a first one of the material inlets being coupled to a source of a polyol and a second one of the material inlets being coupled to a source of an isocyanate, and an exit opening, the extruder body being configured to mix the one or more material components of the extrudate, and to convey the mixture so formed to the exit opening, wherein the mixing and conveying includes allowing the polyol and the isocyanate to react to form the polyurethane;
        a rotatable outlet coupled to the exit opening of the extruder body, the rotatable outlet being configured to allow an extrudate to continue rotating as it leaves the rotatable outlet; and
        a drive mechanism coupled to the outlet and configured to impart rotation to the rotatable outlet,
    a receiving surface configured to receive the extrudate after it leaves the outlet, after having been rotated through a predetermined amount of rotation; and
    a shaping machine configured to receive the extrudate from the receiving surface and to shape the received extrudate into the formed article.

2. The system according to claim 1, wherein the shaping machine is configured to a more complex pattern on a bottom side of the formed article than on a top side of the formed article.

3. The system according to claim 1, wherein the extruder further comprises a filler inlet configured to introduce a filler material into the extruder body.

4. The system according to claim 1, wherein the extruder comprises one or more rotatable screws configured to mix the materials in the extruder body and convey the mixture to the exit opening of the extruder body.

5. The system according to claim 1, wherein the extruder further comprises a fibrous material inlet configured for the introduction of a fibrous material or precursor therefor into the extruder body.

6. The system according to claim 5, wherein the fibrous material inlet is coupled to a source of fiberglass.

7. The system according to claim 5, wherein the extruder body includes a plurality of modules each of which includes a barrel segment, wherein the plurality of modules comprises at least a first module including the one or more material inlets and a second module including the fibrous material inlet.

8. The system according to claim 7, wherein the plurality of modules includes at least two mixing modules downstream of the one or more material inlets and the fibrous material inlet, each of the mixing modules comprising screw elements that include mixing elements.

9. A method of producing formed article, the method comprising:
    providing an extruder according to claim 1;
    introducing into the extruder body the polyol through the first one of the material inlets and the isocyanate through the second one of the material inlets;
    conveying the resulting mixture to the exit opening of the extruder body;
    rotating the outlet about an aperture of the outlet as an extrudate comprising the polyurethane passes through the outlet, without any cleaning structure contacting an internal surface or distal end of the rotatable outlet;
    receiving the extrudate on the receiving surface; and
    receiving the extrudate from the receiving surface at the shaping machine, and shaping the extrudate into the formed article.

10. A system for producing a formed article, the system comprising:
    an extruder comprising:
        an extruder body comprising one or more matrix material inlets each configured for the introduction of a material component of a matrix material of an extrudate into the extruder body, a fibrous material inlet coupled to a source of fiberglass, and an exit opening, the extruder body being configured to mix the one or more material components of the matrix material and the fibrous material, and to convey the mixture so formed to the exit opening;

a rotatable outlet coupled to the exit opening of the extruder body, the rotatable outlet being configured to allow an extrudate to continue rotating as it leaves the rotatable outlet; and a drive mechanism coupled to the outlet and configured to impart rotation to the rotatable outlet, a receiving surface configured to receive the extrudate after it leaves the outlet, after having been rotated through a predetermined amount of rotation; and a shaping machine configured to receive the extrudate from the receiving surface and to shape the received extrudate into the formed article.

11. The system according to claim 10, wherein the shaping machine is configured to a more complex pattern on a bottom side of the formed article than on a top side of the formed article.

12. The system according to claim 10, wherein the extruder further comprises a filler inlet configured to introduce a filler material into the extruder body.

13. The system according to claim 10, wherein the extruder body includes a plurality of modules each of which includes a barrel segment, wherein the plurality of modules comprises at least a first module including the one or more matrix material inlets and a second module including the fibrous material inlet.

14. The system according to claim 13, wherein the plurality of modules includes at least two mixing modules downstream of the one or more matrix material inlets and the fibrous material inlet, each of the mixing modules comprising screw elements that include mixing elements.

15. A method of producing formed article, the method comprising:
providing an extruder according to claim 10;
introducing into the extruder body a polyol through a first one of the material inlets and an isocyanate through a second one of the material inlets;
conveying the resulting mixture to the exit opening of the extruder body;
rotating the outlet about an aperture of the outlet as an extrudate comprising the matrix material and the fibrous material disposed in the matrix material passes through the outlet, without any cleaning structure contacting an internal surface or distal end of the rotatable outlet;
receiving the extrudate on the receiving surface; and
receiving the extrudate from the receiving surface at the shaping machine, and shaping the extrudate into the formed article.

\* \* \* \* \*